US011256658B2

(12) United States Patent
Kruengkrai et al.

(10) Patent No.: US 11,256,658 B2
(45) Date of Patent: Feb. 22, 2022

(54) CAUSALITY RECOGNIZING APPARATUS AND COMPUTER PROGRAM THEREFOR

(71) Applicant: National Institute of Information and Communications Technology, Tokyo (JP)

(72) Inventors: Canasai Kruengkrai, Tokyo (JP); Chikara Hashimoto, Tokyo (JP); Kentaro Torisawa, Tokyo (JP); Julien Kloetzer, Tokyo (JP); Jonghoon Oh, Tokyo (JP); Masahiro Tanaka, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 421 days.

(21) Appl. No.: 16/336,676

(22) PCT Filed: Sep. 28, 2017

(86) PCT No.: PCT/JP2017/035148
§ 371 (c)(1),
(2) Date: Mar. 26, 2019

(87) PCT Pub. No.: WO2018/066445
PCT Pub. Date: Apr. 12, 2018

(65) Prior Publication Data

US 2021/0286948 A1 Sep. 16, 2021

(30) Foreign Application Priority Data

Oct. 5, 2016 (JP) ............................ JP2016-197306

(51) Int. Cl.
*G06F 16/95* (2019.01)
*G06F 16/2457* (2019.01)
(Continued)

(52) U.S. Cl.
CPC .......... *G06F 16/00* (2019.01); *G06F 16/3344* (2019.01); *G06F 40/20* (2020.01);
(Continued)

(58) Field of Classification Search
CPC ............. G06F 16/3329; G06F 16/3344; G06F 16/90332; G06F 40/205; G06F 40/211;
(Continued)

(56) References Cited

U.S. PATENT DOCUMENTS

2003/0130837 A1* 7/2003 Batchilo ............... G06F 40/253 704/9
2010/0235165 A1* 9/2010 Todhunter ............... G06F 40/35 704/9
(Continued)

FOREIGN PATENT DOCUMENTS

JP 2007-219947 A 8/2007
JP 2013-175097 A 9/2013
WO 2014/017023 A1 1/2014

OTHER PUBLICATIONS

Oh et al, "semi-supervised learning approach to why-question answering", Mar. 5, 2016, In Thirtieth AAAI Conference on Artificial Intelligence 2016, pp. 3022-3029.*
(Continued)

*Primary Examiner* — Olujimi A Adesanya
(74) *Attorney, Agent, or Firm* — Renner, Otto, Boisselle & Sklar, LLP

(57) ABSTRACT

A causality recognizing apparatus includes a candidate vector generating unit configured to receive a causality candidate for generating a candidate vector representing a word sequence forming the candidate; a context vector generating unit generating a context vector representing a context in which noun-phrases of cause and effect parts of the causality candidate appear; a binary pattern vector generating unit, an
(Continued)

answer vector generating unit and a related passage vector generating unit, generating a word vector representing background knowledge for determining whether or not there is causality between the noun-phrase included in the cause part and the noun-phrase included in the effect part; and a multicolumn convolutional neural network learned in advance to receive these word vectors and to determine whether or not the causality candidate has causality.

5 Claims, 11 Drawing Sheets

(51) Int. Cl.

| | |
|---|---|
| ***G06F 16/00*** | (2019.01) |
| ***G06F 40/20*** | (2020.01) |
| ***G06F 16/33*** | (2019.01) |
| ***G06F 40/289*** | (2020.01) |
| ***G06F 40/30*** | (2020.01) |
| ***G06N 3/04*** | (2006.01) |
| ***G06N 5/00*** | (2006.01) |
| ***G06N 5/02*** | (2006.01) |

(52) U.S. Cl.
CPC ............ *G06F 40/289* (2020.01); *G06F 40/30* (2020.01); *G06N 3/04* (2013.01); *G06N 5/003* (2013.01); *G06N 5/022* (2013.01)

(58) Field of Classification Search
CPC ............... G06F 40/284; G06F 16/2455; G06F 16/3338; G06F 16/903; G06F 40/20; G06F 16/2428; G06F 16/2453; G06F 16/24522; G06F 16/3331; G06N 20/00; G06N 5/022; G06N 3/08; G06N 5/003
See application file for complete search history.

(56) References Cited

U.S. PATENT DOCUMENTS

2012/0179682 A1* 7/2012 De Saeger ............ G06F 40/216 707/737
2015/0026106 A1* 1/2015 Oh ...................... G06F 16/3329 706/12
2015/0039296 A1 2/2015 Hashimoto
2016/0155058 A1* 6/2016 Oh ......................... G06N 5/041 706/11
2016/0321244 A1* 11/2016 Hashimoto ........... G06F 40/237
2016/0328657 A1* 11/2016 Hashimoto ............. G06F 40/30
2016/0357854 A1* 12/2016 Hashimoto ............. G06F 40/30
2019/0251171 A1* 8/2019 Inada ..................... G06N 20/10

OTHER PUBLICATIONS

C. Hashimoto et al., "Toward Future Scenario Generation: Extracting Event Causality Exploiting Semantic Relation, Context, and Association Features", In Proceedings of the 52nd Annual Meeting of the Association for Computational Linguistics (ACL 2014), pp. 987-997 (discussed in specification).

Jong-Hoon Oh et al., "Why-Question Answering using Intra- and Inter-Sentential Causal Relations", In Proceedings of the 51st Annual Meeting of the Association for Computational Linguistics, Aug. 4-9, 2013, pp. 1733-1743 (discussed in specification).

C. Hashimoto et al., "Excitatory or Inhibitory: A New Semantic Orientation Extracts Contradiction and Causality from the Web", In Proceedings of the 2012 Joint Conference on EMNLP-CoNLL, pp. 619-630.

S. Abe et al., "Two-phased event relation acquisition: Coupling the relation-oriented and argument-oriented approaches", In Proceedings of the 22nd International Conference on Computational Linguistics (Coling 2008), pp. 1-8.

K. Radinsky et al., "Learning Causality for News Events Prediction", In Proceedings of the 21st International World Wide Web Conference 2012, pp. 909-918.

C. Kruengkrai et al., "Improving Event Causality Recognition with Multiple Background Knowledge Sources Using Multi-Column Convolutional Neural Networks", In Proceedings of the 31st AAAI Conference on Artificial Intelligence (AAAI-17), 2017.

International Search Report for corresponding App. No. PCT/JP2017/035148, dated Dec. 19, 2017.

* cited by examiner

CAUSALITY RECOGNIZING APPARATUS AND COMPUTER PROGRAM THEREFOR

TECHNICAL FIELD

The present invention relates to an apparatus for extracting causality from expressions existing in natural language text and, more specifically, to a technique for recognizing and extracting causality expressed without explicit clue terms in text described in a natural language.

BACKGROUND ART

Automatic recognition of event causalities written in Web texts and the like is an important technique, for example, to automatically generate future scenarios to enable right decision making. Highly precise recognition, however, has been difficult because event causality is expressed in a wide range of forms. For example, the sentence "an earthquake occurred, and tsunami came" is considered to clearly express a causality including a cause "an earthquake occurred" and an effect "tsunami came." This sentence, however, does not include any explicit clue term such as a conjunction "because" or "since." Conventional art recognizes causalities based on clue term related to causality and, therefore, it is difficult to recognize causality without such clue terms. It is important to extract causalities with a high precision also from such texts, in order to accumulate pieces of knowledge related to wider range of causalities, to comprehend documents, to develop why-type question answering and to generate future scenarios and so on.

Prior art in this field includes a technique of recognizing phrase pairs representing a cause and an effect of causalities using not only such clue terms but also some language expression patterns, as well as automatic recognition technique of cause and effect phrase pairs using machine learning based on language expressions rather than patterns.

CITATION LIST

Non Patent Literature

NPL 1: Chikara Hashimoto, Kentaro Torisawa, Julien Kloetzer, Motoki Sano, Istvan Varga, Jong-Hoon Oh, and Yutaka Kidawara. 2014. Toward future scenario generation: Extracting event causality exploiting semantic relation, context, and association features. In Proceedings of ACL, pages 987-997.

NPL 2: Jong-Hoon Oh, Kentaro Torisawa, Chikara Hashimoto, Motoki Sano, Stijn De Saeger, and Kiyonori Ohtake. 2013. Why-question answering using intra- and inter-sentential causal relations. In Proceedings of ACL, pages 1733-1743.

SUMMARY OF INVENTION

Technical Problem

The conventional methods for causality recognition, however, still suffer from low precision and limited coverage. The reason for this may be that causality is expressed in a wide range of forms that often lack explicit clue terms indicating causality, and that a large number of patterns may indicate causalities.

Consider, for example, the following two sentences.

1. Typhoons have strengthened because global warming has progressed.

2. Global warming progressed, and typhoons strengthened.

The first sentence includes the word "because," which explicitly indicates the causality between the effect "typhoons have strengthened" and the cause "global warming has progressed." By contrast, the second sentence has no such clue terms. Nonetheless, many people would apprehend that the sentence expresses the same causality as the first sentence. This is possible because people have background knowledge about the "typhoons" and the "global warming." Since causalities are often expressed without explicit clue terms, it is necessary to recognize the causalities in the second type of sentences with a high precision.

Therefore, an object of the present invention is to provide a causality recognizing apparatus capable of recognizing causality expressions with a high precision from natural language texts regardless of whether or not there is any clue term indicating a causality.

Solution to Problem

According to a first aspect, the present invention provides a causality recognizing apparatus automatically recognizing a causality represented by first and second phrases found in text. The first phrase is a candidate of a cause part of the causality, and the second phrase is a candidate of an effect part of the causality. The first and second phrases both include a combination of a noun-phrase and a predicate. The causality recognizing apparatus includes: a first vector generating means configured to receive a causality candidate including the first and second phrases, for generating a set of first word vectors each representing a word sequence forming the causality candidate; a second vector generating means for generating second word vectors respectively representing word sequences forming contexts in which the first and second phrases appear in the text; a related passage vector generating means for generating a word vector representing background knowledge for determining presence/absence of causality between the noun-phrase included in the first phrase and the noun-phrase included in the second phrase; and a classifying means pre-trained to output, by receiving the first and second word vectors and the word vector generated by the related passage vector generating means, an index indicating that the causality candidate from which the word vectors are derived represents causality. The background knowledge vector generating means includes an arbitrary combination including at least one of: a third word vector generating means for collecting a pattern including the noun-phrase included in the first phrase, the noun-phrase included in the second phrase and a predicate connecting these noun-phrases from a large number of documents, and for generating a third word vector representing a word sequence of the pattern; a fourth vector generating means generating a why-type question from the causality candidate, receiving a set of answers to the why-type question from a why-type question answering apparatus, and for generating a fourth word vector representing a word sequence including at least the noun-phrase included in the first phrase and the noun-phrase included in the second phrase, from an answer including both the noun-phrase included in the first phrase and the noun-phrase included in the second phrase, among the answers in the set of answers; and a fifth vector generating means for generating, from a passage as a set of prescribed number of consecutive sentences existing in a large number of documents, in which the noun-phrase included in the first phrase, the noun-phrase included in the second phrase and a clue term related to causality co-occur, a fifth word vector representing a word sequence concatenating the noun-phrases included in the first and second phrases, a word representing dependency between these in the set of sentences and the clue term included in the set of sentences.

Preferably, the classifying means includes a multicolumn neural network having a plurality of columns and learned in advance to receive the first and second word vectors and the word vector output from the background knowledge vector generating means at sub-networks of different columns respectively and to output an index indicating that the causality candidate from which the word vectors are derived represents causality.

More preferably, the third vector generating means includes: a binary pattern collecting means for collecting, from the large number of documents, a binary pattern formed of a pattern including the noun-phrase included in the first phrase, the noun-phrase included in the second phrase, and the predicate connecting the noun-phrases; a frequency counting means for counting frequency of appearance of the binary pattern collected by the binary pattern collecting means; and means for generating a word vector representing a word sequence forming a prescribed number of binary patterns having top frequency counts counted by the frequency counting means from the binary patterns collected by the collecting means and for outputting the word vector as the third word vector.

More preferably, the fourth vector generating means includes: an answer obtaining means for generating a why-type question by adding an interrogative representing a why-type question to the second phrase and applying it to the why-type question answering apparatus, thereby obtaining a set of answers from the why-type question-answering apparatus; an extracting means for extracting a prescribed number of answers including both the noun-phrase included in the first phrase and the noun-phrase included in the second phrase, from the set of answers obtained by the answer obtaining means; a dependency analysis means for analyzing dependency of each of the answers extracted by the extracting means and for generating a dependency structure; and a means for generating, for each of the answers extracted by the extracting means, a word vector representing a word sequence including the noun-phrases included in the first and second phrases and a word at a position of a prescribed relation on the dependency structure generated by the dependency analysis means, and for outputting it as the fourth vector.

The fifth word vector generating means includes: a retrieving means for retrieving, from a large number of documents, a passage as a set of prescribed number of consecutive sentences, in which the noun-phrase included in the first phrase, the noun-phrase included in the second phrase and a clue term related to causality co-occur; a dependency analysis means for analyzing dependency of the passage retrieved by the retrieving means and generating a dependency structure; and a means for generating a fifth word vector from a word sequence by concatenating a word existing on a path between the noun-phrases included in the first and second phrases in the dependency structure generated by the dependency analysis means and the clue term included in the passage.

According to a second aspect, the present invention provides a computer program causing a computer to function as any of the above-described causality recognizing apparatuses.

DESCRIPTION OF EMBODIMENTS

Figure 1:
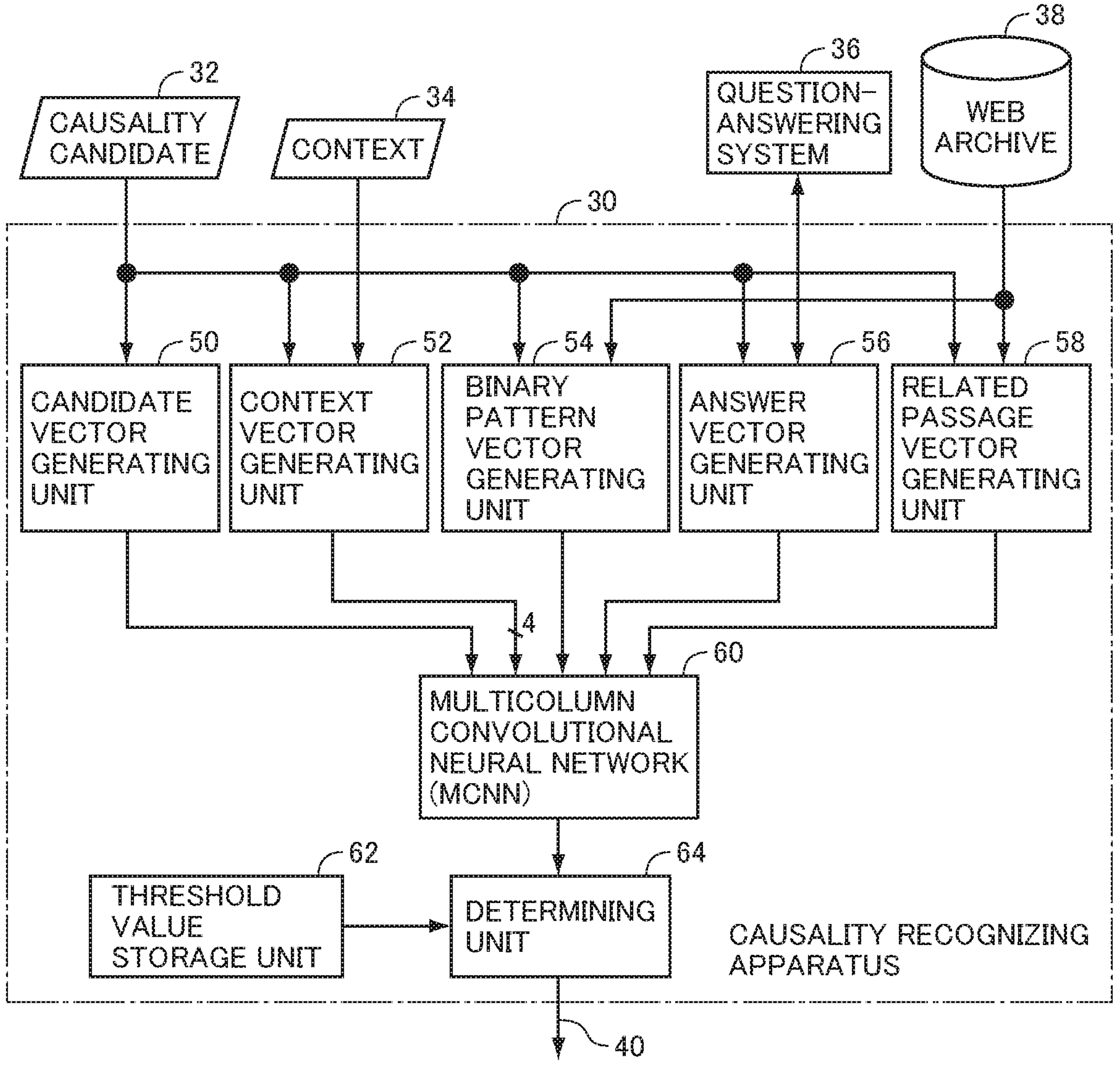
FIG. 1 is a block diagram of a causality recognizing apparatus in accordance with an embodiment of the present invention.

In the following description and in the drawings, the same components are denoted by the same reference characters. Therefore, detailed description thereof will not be repeated.

In the following embodiment, a configuration and an operation of a causality recognizing apparatus that recognizes and extracts expressions indicating causalities from natural language texts, regardless of presence/absence of any clue term indicating causality in the texts will be described. In the present embodiment, a wide range of background knowledge written in web texts of a web archive is processed by neural networks (convolutional neural network and LSTM: Long Short Term Memory) to recognize causalities. More specifically, given a causality candidate, the neural network searches for and extracts sentences that are more or less related to the causality candidate, and determines whether the candidate is a proper causality or not by using the background knowledge expressed by the sentences. The web texts are retrieved in accordance with some specific criteria as described below.

In the following embodiment, the targets are combinations of expressions such as “global warming progresses”→“typhoons strengthen,” in which the former represents a cause part and the latter represents an effect part. The cause part and the effect part each consist of a noun phrase and a predicate (verb).

Prior to the description of the embodiment of the present invention, the technique discussed in Non-Patent Literature 1 will be described. According to Non-Patent Literature 1, background knowledge extracted from web archives is used for causality recognition. In the technique described in Non-Patent Literature 1, a set of patterns (referred to as “binary patterns”) stating noun phrases A and B in such a form like “A causes B” or “A prevents B” is used, and specific features expressing whether or not binary patterns having noun phrases of causality candidates in places of A and B exist in a large number of web texts are incorporated to the features of a classifier, whereby the performance of the classifier is improved.

By way of example, assume that it is to be determined whether a causality candidate "smoke cigarettes"→"die of lung cancer" is correct or not. In Non-Patent Literature 1, whether the combination of noun phrases "cigarettes" and "lung cancer" satisfies any binary pattern in the web archives is studied, and if any such pattern is found, such a pattern is introduced to the features to be input to the classifier (an SVM in Non-Patent Literature 1). It is noted that not only causality patterns but also binary patterns composed of material relation ("A is made from B"), use relation ("A is used for B") and the like are also used in Non-Patent Literature 1. According to Non-Patent Literature 1, use of these contributed to improved precision of causality recognition. This possibly indicates that pieces of information covering a vast area can be used as clue terms to improve precision of causality determination.

In the present embodiment, in order to determine causality using a wide range of information, Multicolumn Convolutional neural network (MCNN), as will be described later, is used. By using MCNN, it becomes possible to use wide variety of background knowledge related to causalities for recognizing causalities.

Causality recognition of the present embodiment utilizes answers from a why-type question-answering apparatus as will be described later. In addition, two different types of information items each using two noun phrases in causality candidates are also used as inputs to the MCNN. Specifically, A) A wider range of binary patterns than those used in Non-Patent Literature 1. In Non-Patent Literature 1, semantic restrictions are imposed on the patterns, while in the present embodiment, such restrictions are not imposed, and retrieved binary patterns are all used.

B) A set of sentences (referred to as "related passage") consisting of one or two consecutive sentences in a document in the web archive, that includes clue terms related to causalities such as "reason" or "because" and two noun phrases in a causality candidate co-occurring in its range. In the following embodiment, only a simple word matching is used to extract such a passage, and no sophisticated searching mechanism is used. What is done is to simply retrieve one or two consecutive sentences including the above-described two noun phrases and the clue term. Apparently, the number of sentences is not limited to two, and three or more may be possible. Considering computational complexity, however, appropriate upper limit is two or three. It goes without saying that the upper limit changes depending on the computer performance.

It may be possible that answers from why-type question-answering apparatus include many answers having no useful information. There is a higher possibility that the information of type B mentioned above does not include any helpful information items, because such items are retrieved by simple word matching. This type of information is adopted simply because the information items can be obtained by a simple process with small computational complexity. Further, the why-type question answering system and the type B information above are more complex than the binary patterns and are not suitable as pieces of information to be fed to a classifier. Therefore, in the present embodiment, we developed a method for making these expressions more compact and nevertheless effectively capturing useful background knowledge.

While the target language is Japanese in the following embodiments, the present invention is believed to be extendable to other languages without much cost.

EMBODIMENTS

The apparatus in accordance with an embodiment described in the following receives as inputs such causality candidates as "smoke cigarettes"→"die of lung cancer." Receiving such an input of causality candidates, the apparatus of the embodiment determines whether or not these expressions represent proper causalities. A basic criterion for determining whether or not a causality candidate of a cause candidate A and an effect candidate B is a proper causality is that if an event A occurs, the probability of occurrence of the event B increases, and only if this relation holds, the causality candidate is determined to be proper. In actual determination, it is necessary that the determination is possible only by the causality candidate without considering the contexts of the causality candidate.

A causality candidate consists of a cause candidate and an effect candidate, as mentioned above. Both the cause candidate and the effect candidate include a combination of a predicate and a noun phrase, which is an argument for the predicate. Specifically, "smoke cigarettes" is a combination of a predicate "smoke X" having the argument X and a noun phrase "cigarettes" that fills X, and "die of lung cancer" is a combination of a predicate "die of X" and a noun phrase "lung cancer" that fills X. In the following, a predicate having the argument X ("smoke X," "die of X" and so on) will be referred to as a template. The cause part must also depend on the effect part in some way or another, through such connectives as "then" or "and." The templates may have the same format as that disclosed in Non-Patent Literature 1, since this format contains only the essence of causalities and it is easy to use in applications.

<Configuration>

[Causality Recognizing Apparatus]

FIG. 1 is a schematic block diagram of a causality recognizing apparatus 30 in accordance with an embodiment of the present invention. Referring to FIG. 1, causality recognizing apparatus 30 includes: a candidate vector generating unit 50 configured to receive a causality candidate 32, for generating a word embedding vector from a word sequence representing words included in the causality candidate 32, and outputting the vector as a candidate vector; and a context vector generating unit 52 configured to receive causality candidate 32 and a context 34 of a sentence in which causality candidate 32 appears, for generating a word embedding vector representing the context in which causality candidate 32 appears, and outputting the vector as a context vector.

Causality recognizing apparatus 30 further includes: a binary pattern vector generating unit 54 connected to a computer-readable web archive 38 storing a large number of web documents, configured to receive causality candidate 32, for collecting a binary pattern including a noun phrase included in the cause part of causality candidate 32, a noun phrase included in the effect part and a predicate connecting these noun phrases, and generating a word embedding vector representing a word sequence of the binary pattern; an answer vector generating unit 56 connected to an external question-answering system 36, configured to receive a set of answers by automatically generating why-type questions from causality candidate 32 and by giving them to question-answering system 36, and for generating word embedding vectors from those of the answers which include both the noun-phrase included in the cause part and the noun-phrase included in the effect part of causality candidate 32, and for outputting the word embedding vectors, said word embedding vectors representing a word sequence including at least these noun-phrases and possibly a clue term related to the causality; and a related passage vector generating unit 58, connected to web archive 38, configured to receive causality candidate 32, for extracting a passage from documents in web archive 38, the passage consisting of a set of one or consecutive two sentences in which the noun-phrase in the cause part and the noun-phrase in the effect part of causality candidate 32 co-occur, for generating a word embedding vector representing a word sequence including words on a path connecting these noun-phrases in dependency structure among these sentences and, if any, a clue term indicating the causality in the set of sentences, and for outputting the vector as a related passage vector representing background knowledge believed to be widely related to the causality candidate.

Causality recognizing apparatus 30 further includes: a Multicolumn Convolutional Neural Network (MCNN) 60 having eight columns, configured to receive a candidate vector from candidate vector generating unit 50 at the first column, four context vectors from context vector generating unit 52 at the second to fifth columns, a binary pattern vector from binary pattern vector generating unit 54 at the sixth column, an answer vector from answer vector generating unit 56 at the seventh column, and a related passage vector from related passage vector generating unit 58 at the eighth column, trained in advance by machine learning to output a score as an index of probability of the causality candidate 32 being a causality; a determining unit 64 for determining whether or not the causality candidate 32 represents a correct causality by comparing the score output from MCNN 60 with a threshold value, and outputting the result 40; and a threshold value storage unit 62 for storing in advance the threshold value used for the determination by determining unit 64.

Causality recognizing apparatus 30 in accordance with the present embodiment includes, in addition to candidate vector generating unit 50 and context vector generating unit 52, binary pattern vector generating unit 54, answer vector generating unit 56 and related passage vector generating unit 58. The present invention, however, is not limited to such an embodiment. It has been found from experiments, which will be described later, that binary pattern vector generating unit 54, answer vector generating unit 56 and related passage vector generating unit 58 can each improve precision of causality recognition than the prior art. Therefore, causality recognizing apparatus 30 may include any combination of at least one of binary pattern vector generating unit 54, answer vector generating unit 56 and related passage vector generating unit 58.

<Context Vector Generating Unit 52>

Figure 2:
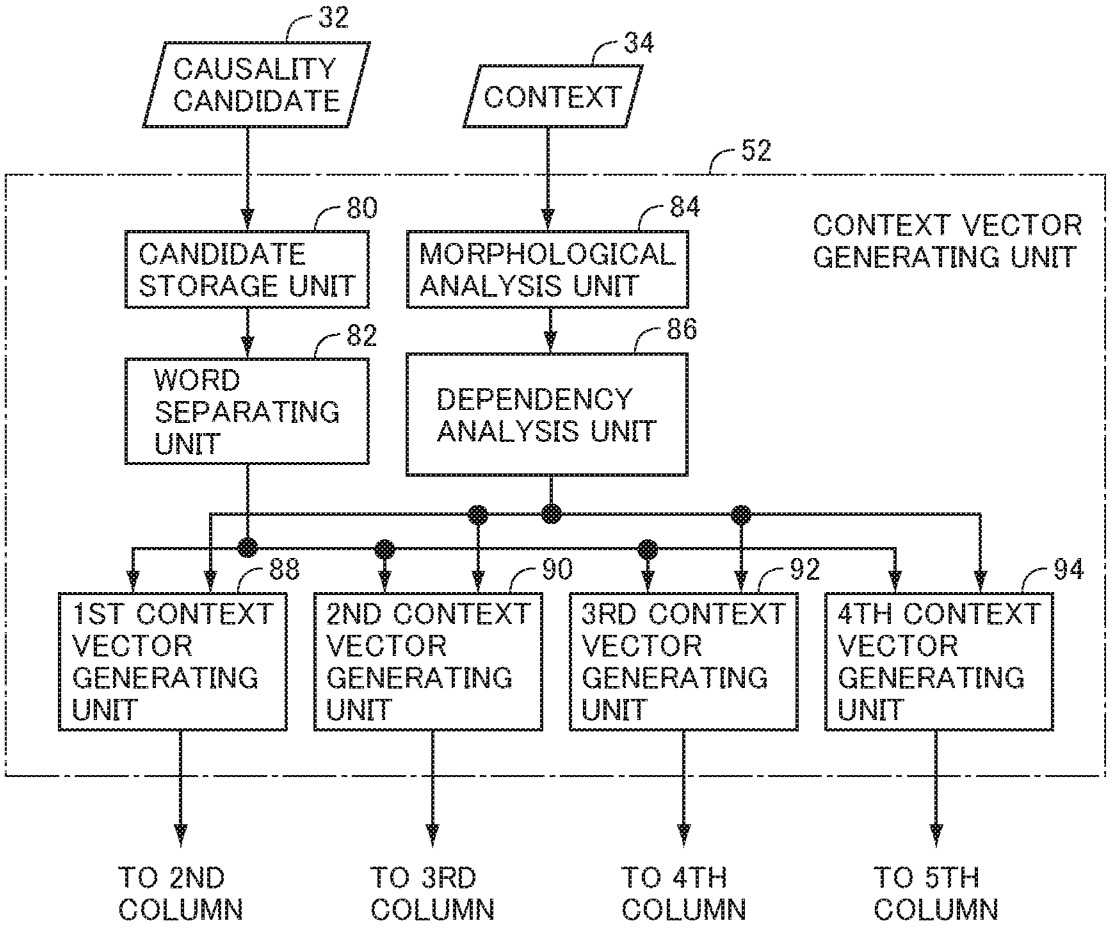
FIG. 2 is a block diagram of a context vector generating unit shown in FIG. 1.

Referring to FIG. 2, context vector generating unit 52 includes: a candidate storage unit 80 configured to receive causality candidate 32 for storing the same; a word separating unit 82 for separating and outputting words (noun-phrase and a predicate forming a template) included in the causality candidate stored in candidate storage unit 80; a morphological analysis unit 84 configured to receive a context 34 consisting of word sequences existing in and around causality candidate 32 in the original document from which causality candidate 32 has been extracted, for performing morphological analysis on each sentence included in context 34; and a dependency analysis unit 86 for performing dependency analysis of the morpheme sequences output from morphological analysis unit 84 and for outputting a dependency structure.

Context vector generating unit 52 further includes: a first context vector generating unit 88 for generating, with reference to the dependency structure output from dependency analysis unit 86, a first context vector consisting of a word sequence existing between the noun-phrase and the predicate in the cause part output from word separating unit 82 in the context and for outputting the same; a second context vector generating unit 90 for generating and outputting a second context vector consisting of a word sequence existing between the noun-phrase and the predicate in the effect part; a third context vector generating unit 92 generating and outputting a third context vector consisting of a word sequence between the noun-phrase in the cause part and the predicate in the effect part; and a fourth context vector generating unit 94 for generating and outputting a fourth context vector consisting of all words appearing after the effect part. The first, second, third, and fourth context vectors are input to the second, third, fourth, and fifth columns of MCNN 60, respectively.

<Binary Pattern Vector Generating Unit 54>

Figure 3:
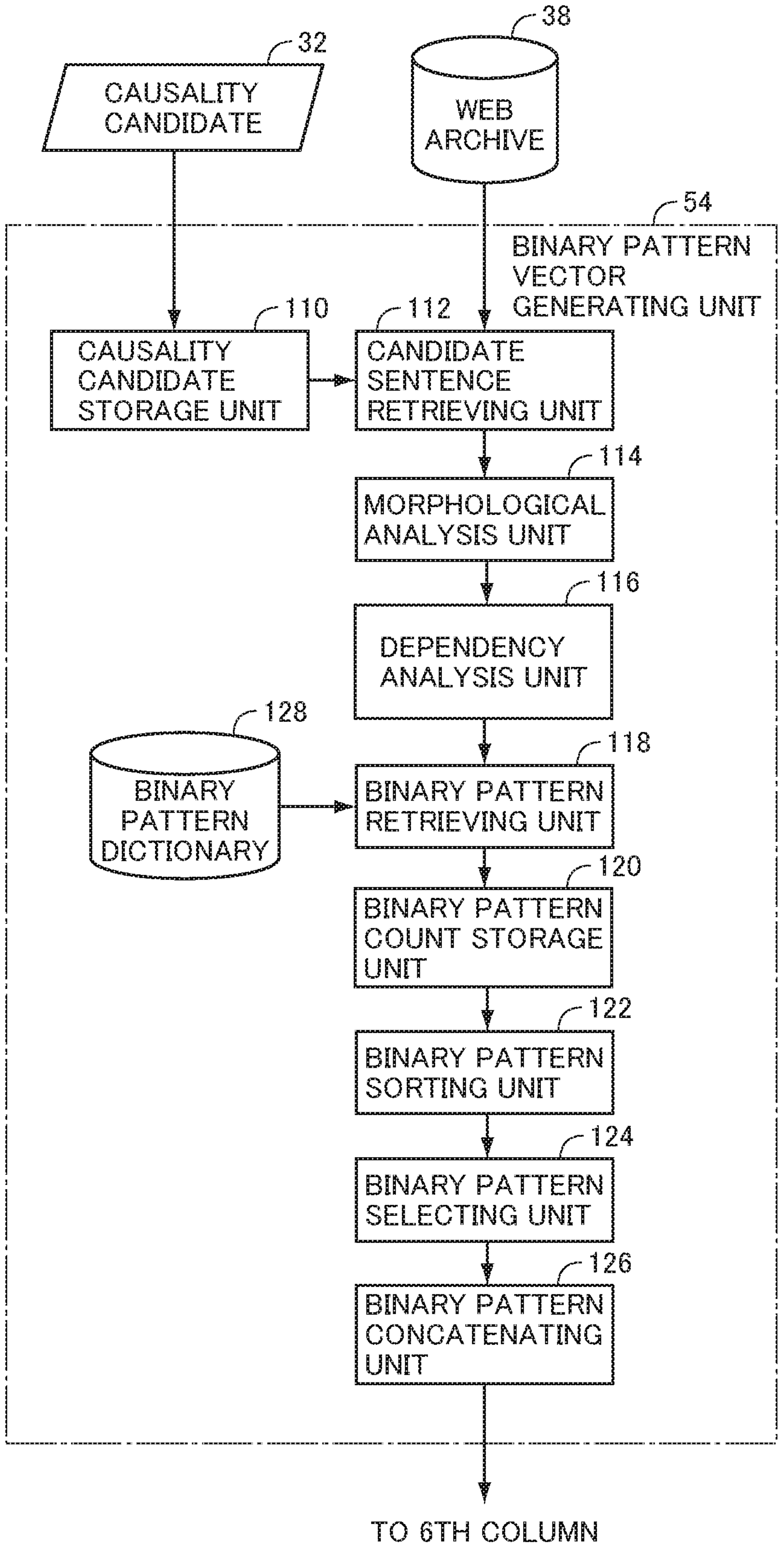
FIG. 3 is a block diagram of a binary pattern vector generating unit shown in FIG. 1.

Referring to FIG. 3, in the present embodiment, as a source of background knowledge, binary patterns extracted from web archive 38 are used. In Non-Patent Literature 1, a set of 395,578 carefully selected binary patterns, such as "A causes B" and "A prevents B," which somewhat represent to causalities are used for recognizing causality. The patterns here are dependency paths connecting two noun phrases (replaced with variables A or B) in the dependency structure. Non-Patent Literature 1 used only the pairs of noun-phrases that appeared at least ten times in the same pattern in 600 million web documents. This condition filters out long and rarely appearing binary patterns, and only relatively short patterns remain. The present embodiment also uses binary patterns retrieved in the similar manner as used in Non-Patent Literature 1. It is noted, however, that the present embodiment does not impose restrictions used in Non-Patent Literature 1, and all patterns are used as long as the two noun-phrases respectively extracted from the cause and effect parts of causality candidate fill variables A and B. Given two noun-phrases, the number of retrieved patterns becomes one to several hundred patterns. In the present embodiment, fifteen binary patterns that are most frequently co-occur with the pair of noun-phrases of the causality candidate are selected from these and concatenated with a delimiter "|" and the resulting word sequence is output. The number "15" selected as the number of binary patterns was determined from the viewpoint of saving computational complexity for training, by preliminary experiments in which up to 200 patterns were tried and no significant changes in performance were observed when the number exceeded 15.

Referring to FIG. 3, binary pattern vector generating unit 54 includes: a causality candidate storage unit 110 configured to receive causality candidate 32 for storing the same; a binary pattern dictionary 128 for storing a large number of binary patterns prepared beforehand; a candidate sentence retrieving unit 112 configured to retrieve, from web archive 38, a candidate sentence including a word sequence in which a pair of noun-phrases extracted from the cause and effect parts of causality candidate storage unit 110 and a binary pattern stored in binary pattern dictionary 128 possibly co-occur; a morphological analysis unit 114 configured to perform morphological analysis of each of the sentences retrieved by candidate sentence retrieving unit 112 and outputting a morpheme sequence; a dependency analysis unit 116 performing dependency analysis of the morpheme sequence output from morphological analysis unit 114 and outputting a dependency structure; and a binary pattern retrieving unit 118 configured to specify, on the dependency structure output from dependency analysis unit 116, a word sequence, if any, in which the noun-phrase pair output from causality candidate storage unit 110 and a binary pattern stored in binary pattern dictionary 128 co-occur, and to output the corresponding binary pattern.

Binary pattern vector generating unit 54 further includes: a binary pattern count storage unit 120 configured to count the respective occurrences of binary patterns output from binary pattern retrieving unit 118 and to store their counts; a binary pattern sorting unit 122 configured to sort, after all binary patterns are detected from web archive 38, the binary patterns in a descending order of the counts stored in binary pattern count storage unit 120 and to output a list of binary patterns; a binary pattern selecting unit 124 configured to select and output binary patterns of top fifteen counts from the binary pattern list output from binary pattern sorting unit 122; and a binary pattern concatenating unit 126 configured to concatenate the binary patterns selected by binary pattern selecting unit 124 with the delimiter "|" and to output the result as a word embedding vector. The word embedding vector output from binary pattern concatenating unit 126 is input to the sixth column of MCNN 60.

<Answer Vector Generating Unit 56>

In the present embodiment, as one of the sources of background knowledge, outputs of a why-type question-answering system are used. Specifically, the why-type question-answering system described in Non-Patent Literature 2 is used. This system outputs answers to a given why-type question each including seven consecutive sentences extracted from the web archive.

Figure 4:
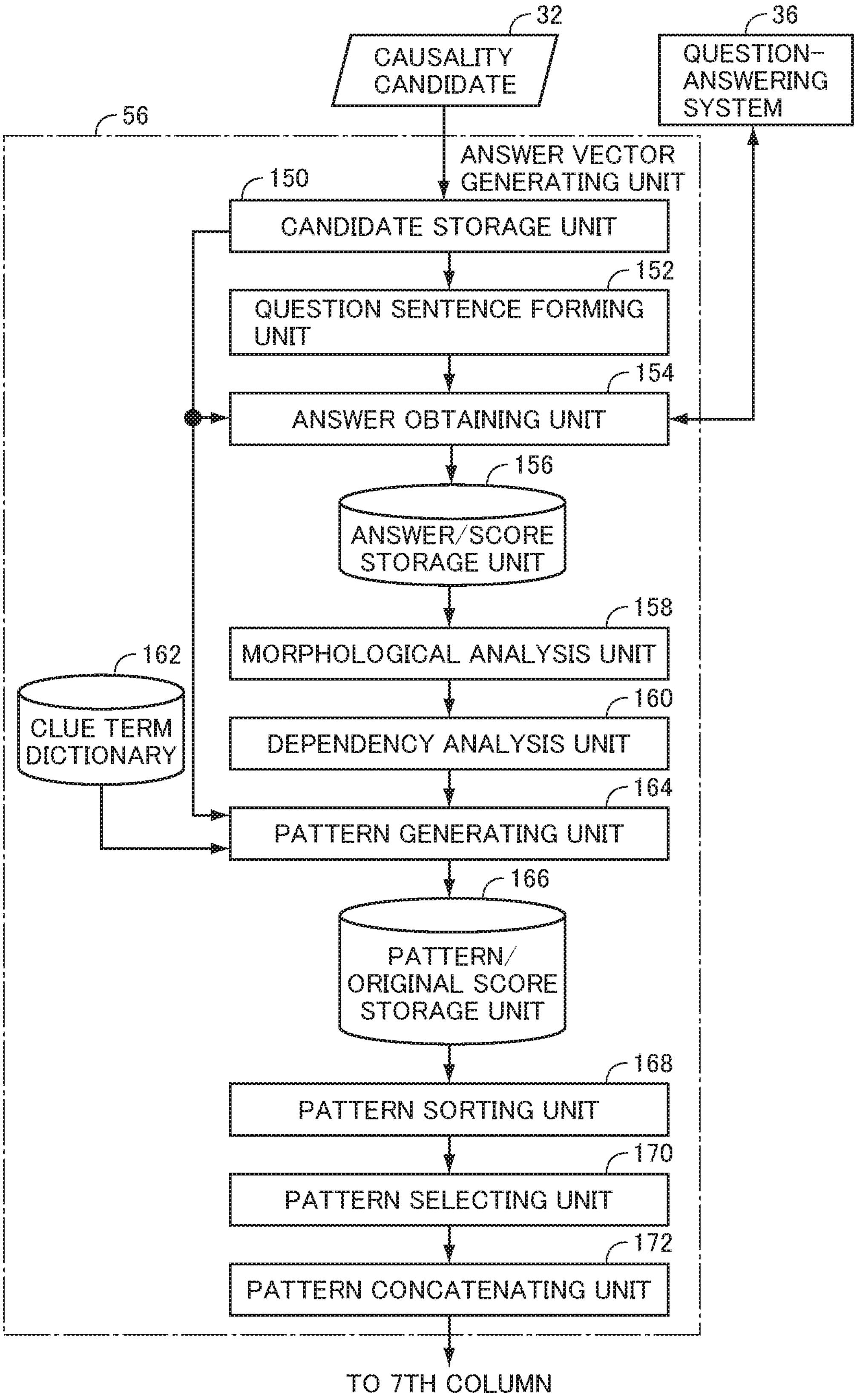
FIG. 4 is a block diagram of an answer vector generating unit shown in FIG. 1.

Referring to FIG. 4, answer vector generating unit 56 includes: a candidate storage unit 150 configured to receive causality candidate 32 for storing the same; a question sentence forming unit 152 configured to automatically form a question sentence by, for example, attaching an interrogative such as "why" to the beginning of an effect part of the candidate in candidate storage unit 150; and an answer obtaining unit 154 configured to obtain a set of a prescribed number of answers and their scores from question-answering system 36, by giving the question sentence formed by question sentence forming unit 152 to question-answering system 36. In question-answering system 36 used in the present embodiment, one answer includes seven consecutive sentences extracted from the web archive and scored by a classifier trained by supervised learning. It is highly likely that top ranked answers contain correct answers to the question. Answer obtaining unit 154 obtains 200 answers of top scores from the answers of question-answering system 36, and outputs only those that include the two noun-phrases extracted respectively from the cause part and the effect part of a causality candidate stored in candidate storage unit 150.

Answer vector generating unit 56 further includes: an answer/score storage unit 156 configured to store sets of answers output from answer obtaining unit 154 together with their scores; a morphological analysis unit 158 configured to perform morphological analysis of each sentence of each answer included in answer/score storage unit 156; a dependency analysis unit 160 configured to perform dependency analysis of a morpheme sequence output from morphological analysis unit 158 and to output a dependency structure; a clue term dictionary 162 configured to store clue terms related to causality; and a pattern generating unit 164 configured to combine word sequences between each of the two noun-phrases extracted from the cause and effect parts of causality candidate and a root of a dependency structure while preserving their order of appearance on a path of dependency structure output from dependency analysis unit 160 with reference to the clue term dictionary 162, and if there is any other clue term related to causality, to generate and output a pattern by further combining the clue term regardless of the position of its appearance.

By way of example, assume that for the question "Why (do people) die of lung cancer?", one of the answers includes the sentence "Many people cannot stop smoking cigarettes, and, as a result, they suffer from lung cancer." From this, a pattern "cannot stop A, and as a result, suffer from B" can be obtained. Here, A and B are variables for noun-phrases from the cause part and effect part, respectively, and "as a result" is the clue term.

Figure 8:
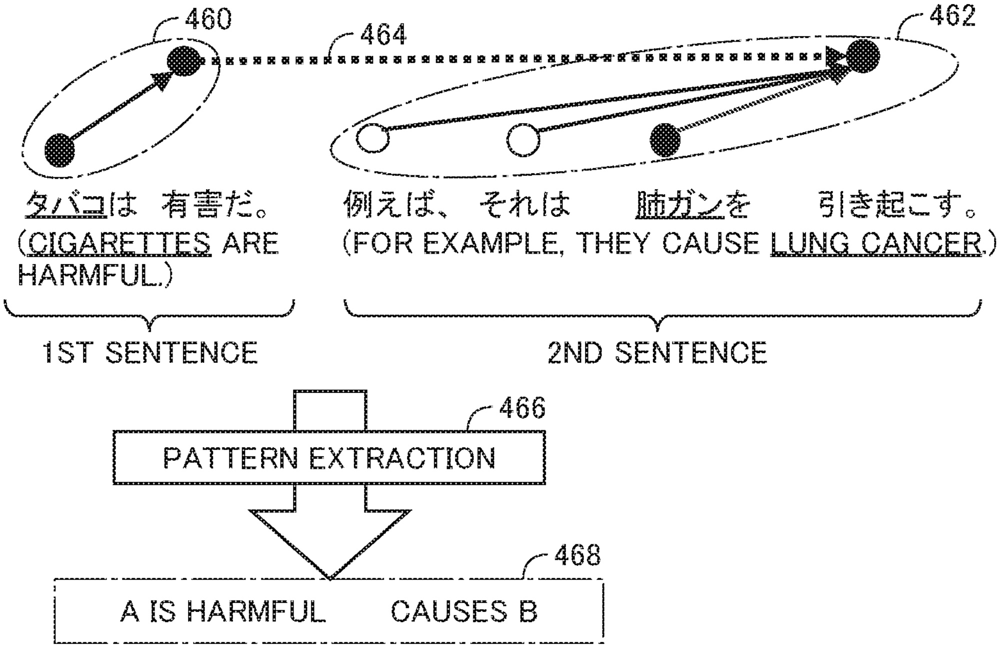
FIG. 8 is a schematic illustration showing an outline of the process for extracting patterns constituting causality.

If two noun-phrases appear in consecutive sentences, an artificial dependency link from the root of dependency structure of the first sentence to that of the second sentence is added, and the above-described pattern is generated assuming that the two sentences are just one sentence. FIG. 8 illustrates this process.

FIG. 8 schematically illustrates the process of extracting a pattern forming causality, assuming that the first noun-phrase "cigarettes" extracted from the causality candidate exists in the first sentence 460 and the second noun-phrase "lung cancer" exists in the second sentence 462. Here, an artificial link 464 is added between the root of first sentence 460 and the second sentence 462, and pattern extraction 466 is performed assuming that the first and second sentences 460 and 462 are just one sentence. Thus, a pattern 468, i.e., "A is harmful and causes B" is extracted.

Returning to FIG. 4, answer vector generating unit 56 further includes: a pattern/original score storage unit 166 for storing patterns generated by pattern generating unit 164 and original scores originally given by question-answering system 36 to the answers from which respective patterns were obtained, in association with each other; a pattern sorting unit 168 sorting, after the pattern generating process by pattern generating unit 164 for an answer from question-answering system 36 is completed, the patterns stored in pattern/original score storage unit 166 in descending order of the scores and outputting the result as a list; a pattern selecting unit 170 selecting top fifteen patterns of the list output from pattern sorting unit 168; and a pattern concatenating unit 172 concatenating the patterns selected by pattern selecting unit 170 using a delimiter and outputting the result as a word embedding vector. Some answers may not contain the noun-phrase of the cause part of the causality candidate because answers can describe the reason of the effect part of the causality candidate from different viewpoints. The output from pattern concatenating unit 172 is input to the seventh column of MCNN 60.

<Related Passage Vector Generating Unit 58>

As another source of background knowledge, the present embodiment uses sentences retrieved from the web archive storing a large number of web documents by searching for sentences including a pair of noun-phrases extracted from the cause and effect parts of a causality candidate and such clue terms relating to causality as "because." The retrieved sentences include one or two consecutive related passages, containing the pair of noun-phrases and any clue term as mentioned above. Then, the patterns are generated from the retrieved passages by the same method as used by answer vector generating unit 56. Frequencies of appearance of each pattern in the entire web archive 38 are calculated, and as in answer vector generating unit 56, fifteen top frequent patterns are used for determining a causality candidate. If patterns have an identical frequency, shorter ones are selected. These patterns are concatenated with a delimiter in the similar manner as done by answer vector generating unit 56, and fed to MCNN 60 as a word embedding vector.

Figure 5:
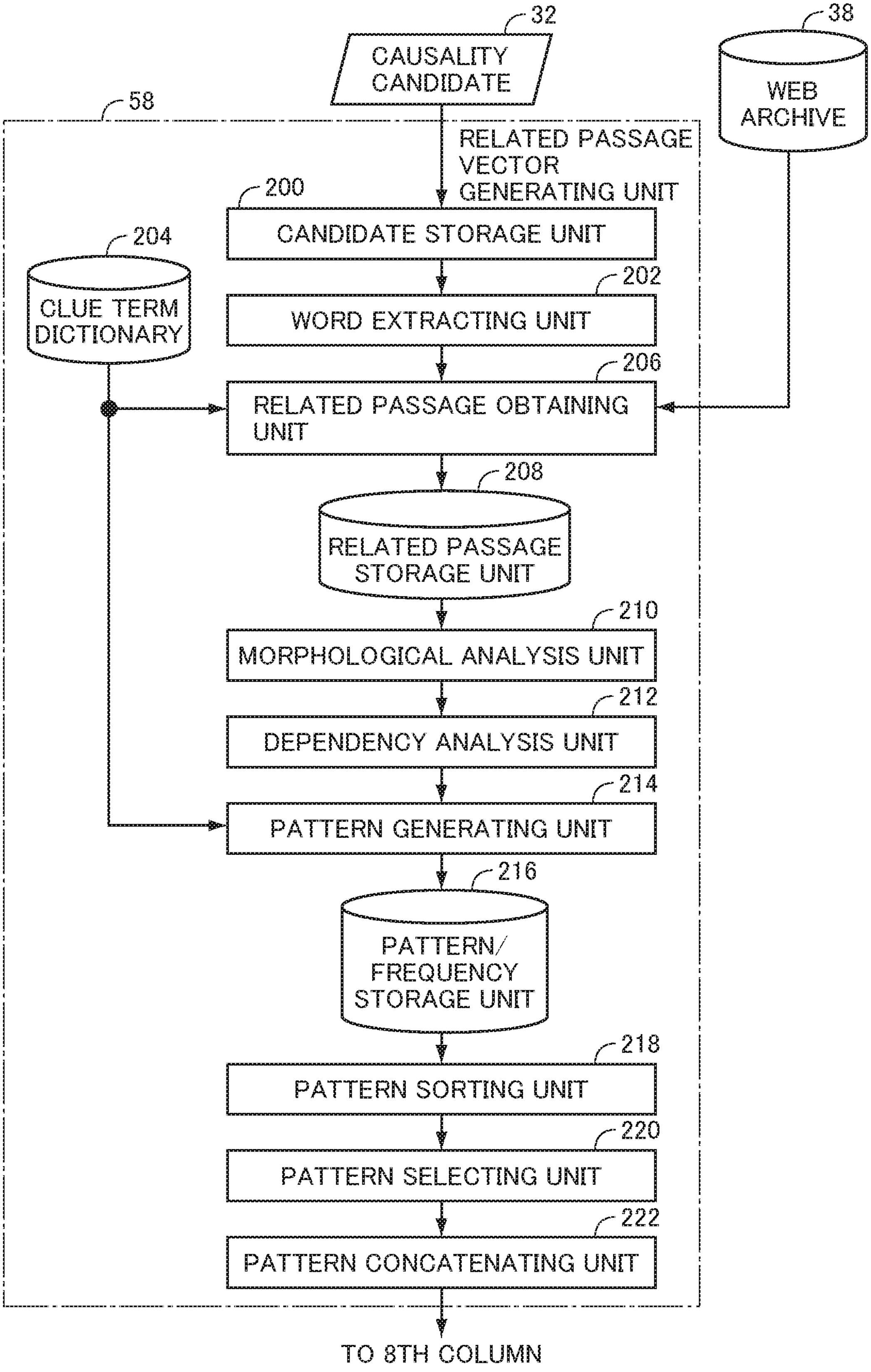
FIG. 5 is a block diagram of a related passage vector generating unit shown in FIG. 1.

Referring to FIG. 5, related passage vector generating unit 58 performing the process described above includes: a candidate storage unit 200 configured to receive a causality candidate 32 for storing the same; a word extracting unit 202 configured to extract noun-phrases from the cause and effect parts of the candidates in candidate storage unit 200; a clue term dictionary 204 configured to store clue terms; a related passage obtaining unit 206 configured to obtain, in web archive 38, a set of one or two consecutive sentences (related passage) in which a pair of noun-phrases extracted by word extracting unit 202 and any of the clue terms stored in clue term dictionary 204 co-occur; and a related passage storage unit 208 configured to store related passages obtained by related passage obtaining unit 206.

Related passage vector generating unit 58 further includes: a morphological analysis unit 210 for performing morphological analysis of a sentence included in each related passage stored in related passage storage unit 208; a dependency analysis unit 212 for performing dependency analysis of a morpheme sequence output from morphological analysis unit 210 and outputting a dependency structure; a pattern generating unit 214 for generating and outputting patterns by the same method as used in pattern generating unit 164 shown in FIG. 4; a pattern/frequency storage unit 216 for storing the patterns generated by pattern generating unit 214 together with their frequencies; a pattern sorting unit 218 configured to sort, after the process by pattern generating unit 214 for web archive 38 is completed, the patterns stored in pattern/frequency storage unit 216 in a descending order of the frequencies and to output the result as a list; a pattern selecting unit 220 for selecting fifteen top frequent patterns from the pattern list output from pattern sorting unit 218; and a pattern concatenating unit 222 for concatenating fifteen patterns output from pattern selecting unit 220 with a delimiter and outputting the result as a word embedding vector. The word embedding vector output from pattern concatenating unit 222 is input to the eighth column of MCNN 60.

<Multicolumn Convolutional Neural Network 60>

Figure 6:
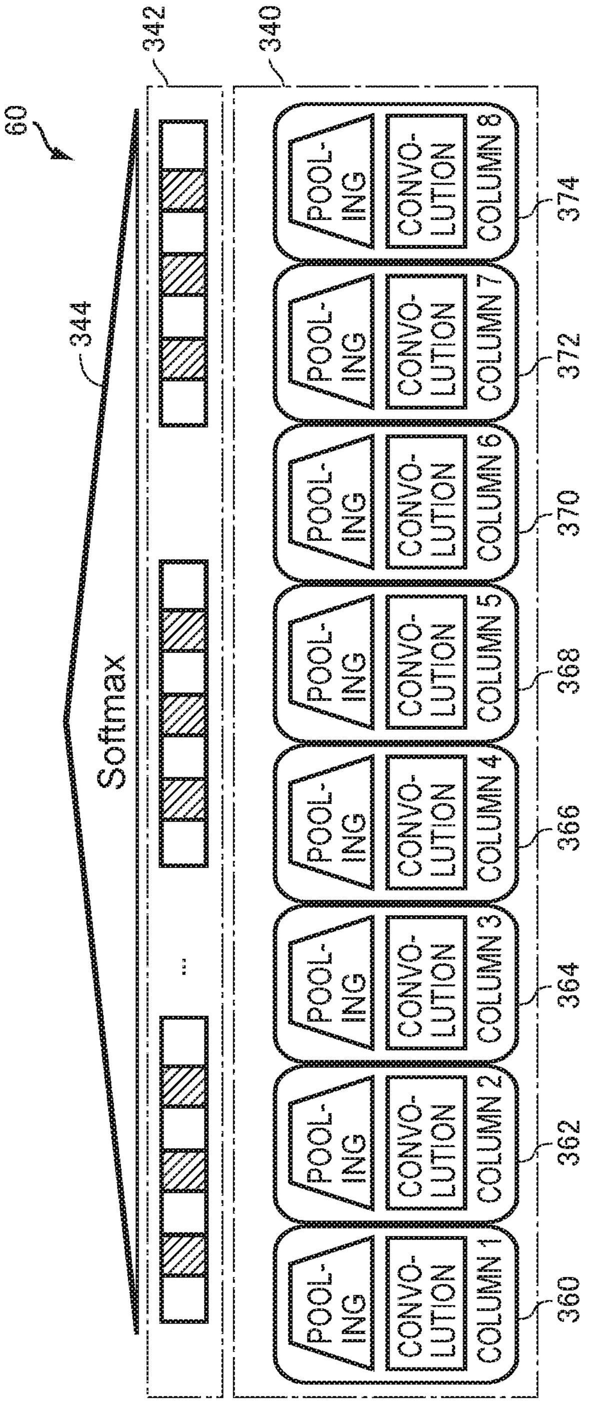
FIG. 6 is a schematic illustration of a neural network shown in FIG. 1.

Referring to FIG. 6, in the present embodiment, MCNN 60 includes: a neural network layer 340 consisting of first to eighth convolutional neural networks 360 to 374; a concatenating layer 342 linearly concatenating outputs of respective neural networks in neural network layer 340; and a Softmax layer 344 configured to apply a Softmax function to the vector output from concatenating layer 342 and to output a score between 0 and 1 evaluating the probability of the causality candidate being proper or not.

Convolutional neural network 360 of the first column receives the candidate vector generated by candidate vector generating unit 50 shown in FIG. 1. Convolutional neural networks 362, 364, 366 and 368 of the second to fifth columns receive the first to fourth context vectors, respectively, output from context vector generating unit 52 shown in FIGS. 1 and 2. Convolutional neural network 370 of the sixth column receives the binary pattern vector output from binary pattern vector generating unit 54 shown in FIGS. 1 and 3. Convolutional neural network 372 of the seventh column receives the answer vector output from answer vector generating unit 56 shown in FIGS. 1 and 4. Convolutional neural network 374 of the eighth column receives the related passage vector output from related passage vector generating unit 58 shown in FIGS. 1 and 5.

Outputs from respective convolutional neural networks of neural network layer 340 are simply linearly concatenated in concatenating layer 342 to form an input vector to Softmax layer 344.

Figure 7:
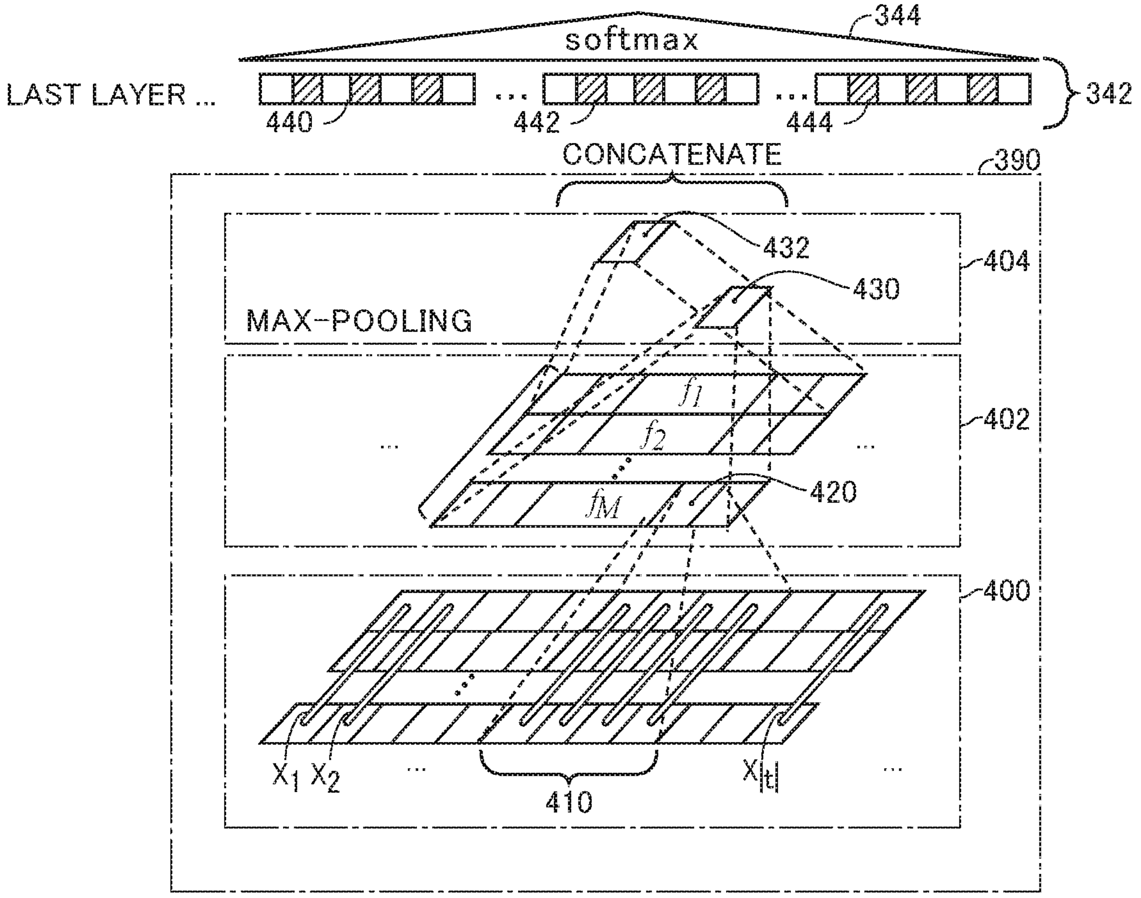
FIG. 7 is a schematic illustration showing a configuration of one column of the neural network shown in FIG. 6.

Functions of MCNN 60 will be described in greater detail. FIG. 7 shows, as a representative, one convolutional neural network 390. It is assumed that convolutional neural network 390 consists only of an input layer 400, a convolution layer 402 and a pooling layer 404 for easier understanding; however, there may be several sets of these three layers.

A word vector sequence $X_1, X_2, \ldots, X_{|t|}$ is input to input layer 400. This word vector sequence $X_1, X_2, \ldots, X_{|t|}$ is represented as a matrix $T=[X_1, X_2, \ldots, X_{|t|}]^T$. M feature maps are applied to matrix T. Each feature map is a vector and Vector O, which is an element of each feature map, is computed by applying a filter denoted by $f_j$ ($1 \leq j \leq M$) to an N-gram consisting of consecutive word vectors while moving N gram 410. O is represented by the following equation. Here, M and N of the filter number M and N-gram are both one of hyper parameters of MCNN 60.

[Equation 1]

$$O=f(W_{f_j} \cdot x_{i'j:N-1}+b_{ij}) \qquad (1)$$

where · denotes element-wise multiplication followed by summation of the results, and f(x)=max (0, x) (normalized linear function). When we represent the number of elements of a word vector by d, $W_{fj}$ is a real-number matrix of d×N dimensions and bias $b_{ij}$ is a real number.

It is noted that N may be the same for all the feature maps or some may be different. N is an arbitrary natural number desirably selected from the range of {2, . . . , 6}. In the present embodiment, combinations of a plurality of consecutive values are used for the N-gram, while weight matrix is the same for all of the convolutional neural networks. Though these may be different from each other, the precision becomes higher when the weight matrix is the same than when each weight matrix is trained independently.

For each of the feature maps, pooling layer 404 performs a so-called max-pooling. Specifically, pooling layer 404 selects, for instance among the elements of feature map $f_M$, the maximum element 420, and takes it out as an element 430. By performing this process on each of the feature maps, elements 432, . . . , 430 are taken out and these are concatenated in order from $f_1$ to $f_M$ and output as a vector 442 to concatenating layer 342. Vectors 440, . . . , 442, . . . , 444 obtained in this manner are output from respective convolutional neural networks to concatenating layer 342. Concatenating layer 342 simply linearly concatenates vectors 440, . . . , 442, . . . , 444 and feeds them to Softmax layer 344. Pooling layer 404 that performs the max-pooling is said to show a higher precision than those performing the average pooling. It is naturally possible, however, to adopt an average value, or to use any other representative value as long as it well represents the nature of a lower layer.

<Operation>

Causality recognizing apparatus 30 in accordance with the above-described embodiment operates as follows.

Referring to FIG. 1, candidate vector generating unit 50 of causality recognizing apparatus 30 receives a causality candidate 32, generates a word embedding vector from a word sequence representing words included in causality candidate 32, and outputs the candidate vector. This candidate vector is input to convolutional neural network 360 of the first column shown in FIG. 6.

Context vector generating unit 52 receives causality candidate 32 and context 34 of texts in which causality candidate 32 appears, generates a word embedding vector representing the context in which causality candidate 32 appears, and outputs it as a context vector.

More specifically, referring to FIG. 2, candidate storage unit 80 of context vector generating unit 52 receives and stores causality candidate 32. Word separating unit 82 separates and outputs words (noun-phrases and a predicate forming a template) included in the causality candidate stored in candidate storage unit 80. Morphological analysis unit 84 receives a context 34 including causality candidate 32 and word sequences existing near the candidate in the document from which causality candidate 52 is obtained, performs morphological analysis of each sentence included in context 34, and outputs a morpheme sequence. Dependency analysis unit 86 performs dependency analysis of the morpheme sequence output from morphological analysis unit 84, and outputs a dependency structure.

The first context vector generating unit 88 refers to the dependency structure output from dependency analysis unit 86, and generates and outputs a first context vector consisting of a word sequence existing between the noun-phrase and the predicate of the cause part output from word separating unit 82 in the context. The second context vector generating unit 90 generates and outputs a second context vector consisting of a word sequence existing between the noun-phrase and the predicate of the effect part. The third context vector generating unit 92 generates and outputs a third context vector consisting of a word sequence between the noun-phrase of the cause part and the predicate of the effect part. The fourth context vector generating unit 94 generates and outputs a fourth context vector consisting of all words appearing after the effect part. The first context vector is input to convolutional neural network 362 of the second column, the second context vector is input to convolutional neural network 364 of the third column, the third context vector is input to convolutional neural network 366 of the fourth column, and the fourth context vector is input to convolutional neural network 368 of the fifth column, of MCNN 60, respectively.

Referring to FIG. 3, binary pattern vector generating unit 54 collects binary patterns each including a noun-phrase included in the cause part and a noun-phrase included in the effect part and a predicate connecting these noun-phrases of causality candidate 32, and generates word embedding vectors representing word sequences of the binary patterns.

More specifically, causality candidate storage unit 110 of binary pattern vector generating unit 54 receives and stores causality candidate 32. Binary pattern dictionary 128 stores a large number of binary patterns prepared in advance. Candidate sentence retrieving unit 112 retrieves, in web archive 38, candidate sentences each including a word sequence in which a pair of noun-phrases extracted from the cause and effect parts of causality candidate storage unit 110 and a binary pattern stored in binary pattern dictionary 128 possibly co-occur. Morphological analysis unit 114 performs morphological analysis of each of the sentences retrieved by candidate sentence retrieving unit 112 and outputs morpheme sequences. Dependency analysis unit 116 performs dependency analysis of the morpheme sequences output from morphological analysis unit 114 and outputs a dependency structures. Binary pattern retrieving unit 118 specifies, on the dependency structures output from dependency analysis unit 116, word sequences, if any, in which the noun-phrase pair output from causality candidate storage unit 110 and a binary pattern stored in binary pattern dictionary 128 co-occur, and outputs the corresponding binary patterns.

Binary pattern count storage unit 120 counts, for each binary pattern, the binary patterns output from binary pattern retrieving unit 118 and stores their counts. Binary pattern sorting unit 122 sorts, after all binary patterns are detected from web archive 38, the binary patterns in descending order of the count values stored in binary pattern count storage unit 120 and outputs a list of binary patterns. Binary pattern selecting unit 124 selects and outputs the binary patterns at the top fifteen counts in the binary pattern list output from binary pattern sorting unit 122. Binary pattern concatenating unit 126 concatenates the binary patterns selected by binary pattern selecting unit 124 with the delimiter "|" and outputs the result as a word embedding vector. The word embedding vector output from binary pattern concatenating unit 126 is input to convolutional neural network 370 of the sixth column of MCNN 60.

Referring to FIG. 4, candidate storage unit 150 of answer vector generating unit 56 receives and stores causality candidate 32. Question sentence forming unit 152 automatically forms a question sentence by, for example, attaching an interrogative such as "why" to the head of an effect part of the candidate in candidate storage unit 150. Answer obtaining unit 154 gives the question sentence formed by question sentence forming unit 152 to question-answering system 36 to obtain a set of a prescribed number of answers and their scores from question-answering system 36. Each answer includes seven consecutive sentences extracted from the web archive and a score is given to each answer. Answer obtaining unit 154 obtains 200 answers of top scores from the answers of question-answering system 36, and outputs only those including the two noun-phrases extracted respectively from the cause part and the effect part of causality candidate stored in candidate storage unit 150.

Answer/score storage unit 156 stores sets of answers output from answer obtaining unit 154 together with their scores. Morphological analysis unit 158 performs morphological analysis of each sentence of each answer included in answer/score storage unit 156. Dependency analysis unit 160 performs dependency analysis of a morpheme sequence output from morphological analysis unit 158 and outputs a dependency structure. Pattern generating unit 164 refers to the clue term dictionary 162 and combines word sequences existing between each of the two noun-phrases extracted from the cause and effect parts of causality candidate and the root of a dependency structure while preserving their order of appearance on the path of dependency structure output from dependency analysis unit 160, to generate a pattern. If there is any other clue terms related to dependency, pattern generating unit 164 combines the clue term to the pattern regardless of the position of its appearance, and outputs the pattern.

Pattern/original score storage unit 166 stores patterns generated by pattern generating unit 164 and original scores given by question-answering system 36 to the answers from which respective patterns were obtained, in association with each other. After the pattern generating process by pattern generating unit 164 for an answer from question-answering system 36 is completed, pattern sorting unit 168 sorts the patterns stored in pattern/original score storage unit 166 in descending order of the scores and outputs the result as a list. Pattern selecting unit 170 selects top fifteen patterns of the list output from pattern sorting unit 168. Pattern concatenating unit 172 concatenates the patterns selected by pattern selecting unit 170 using the delimiter and outputs the result as a word embedding vector. The output from pattern concatenating unit 172 is input to convolutional neural network 372 of the seventh column of MCNN 60.

Referring to FIG. 5, candidate storage unit 200 of related passage vector generating unit 58 receives and stores a causality candidate 32. Word extracting unit 202 extracts noun-phrases from the cause and effect parts, respectively, of the candidate in candidate storage unit 200. Related passage obtaining unit 206 obtains, in web archive 38, a set of one or two consecutive sentences (related passage) in which a pair of noun-phrases extracted by word extracting unit 202 and any of the clue terms stored in clue term dictionary 204 co-occur. Related passage storage unit 208 stores related passages obtained by related passage obtaining unit 206.

Morphological analysis unit 210 performs morphological analysis of a sentence included in each related passage stored in related passage storage unit 208 and outputs a morpheme sequence. Dependency analysis unit 212 performs dependency analysis of the morpheme sequence output from morphological analysis unit 210 and outputs a dependency structure. Pattern generating unit 214 generates and outputs patterns by the same method as used in pattern generating unit 164 shown in FIG. 4. Pattern/frequency storage unit 216 stores the patterns generated by pattern generating unit 214 together with their frequencies. After the process by pattern generating unit 214 for web archive 38 is completed, pattern sorting unit 218 sorts the patterns stored in pattern/frequency storage unit 216 in a descending order of the frequencies and outputs the result as a list. Pattern selecting unit 220 selects fifteen top frequent patterns from the pattern list output from pattern sorting unit 218. Pattern concatenating unit 222 concatenates fifteen patterns output from pattern selecting unit 220 inserting delimiters and output the result as a word embedding vector. The word embedding vector output from pattern concatenating unit 222 is input to convolutional neural network 374 of the eighth column of MCNN 60.

Referring to FIG. 6, convolutional neural network 360 of the first column of MCNN 60 receives the candidate vector generated by candidate vector generating unit 50 shown in FIG. 1. Convolutional neural networks 362, 364, 366 and 368 of the second to fifth columns receive the first to fourth context vectors, respectively, output from context vector generating unit 52 shown in FIGS. 1 and 2. Convolutional neural network 370 of the sixth column receives the binary pattern vector output from binary pattern vector generating unit 54 shown in FIGS. 1 and 3. Convolutional neural network 372 of the seventh column receives the answer vector output from answer vector generating unit 56 shown in FIGS. 1 and 4. Convolutional neural network 374 of the eighth column receives the related passage vector output from related passage vector generating unit 58 shown in FIGS. 1 and 5. These convolutional neural networks each perform internal calculation in accordance with parameters learned in advance, and output the results. The outputs from respective convolutional neural networks are simply linearly concatenated by concatenating layer 342 to be an input vector to Softmax layer 344.

Softmax layer 344 applies Softmax function to the input vector and thereby calculates and outputs a score representing probability that the causality candidate is a proper one.

Determining unit 64 shown in FIG. 1 compares the score with a threshold value stored in threshold value storage unit 62, and if the score is not lower than the threshold value, outputs a value indicating that causality candidate 32 represents proper causality. Otherwise, determining unit 64 outputs a value indicating that causality candidate 32 is improper.

[Experiments]

In the experiments, part of 2,451,254 causality candidates extracted from 600 million web documents in Non-Patent Literature was used as a data set. Three annotators determined the causality properness and annotated the data accordingly. The definition of causality here was that if event A happens, the probability of event B increases, and if determination can be done in accordance with this standard based only on each causality candidate without necessitating consideration of context, the causality is proper. The final decision was made by a majority vote, and Fleiss' kappa was 0.67, showing substantial agreement.

Table 1 shows statistics of Training data, Development data and Test data. The Development data and the Test data were selected by random sampling from all extracted causality candidates, while the Training data were not. There is no causality candidate that is common among these three data sets.

TABLE 1

| Data set | Causality candidates | Proper causalities (%) | |
|---|---|---|---|
| Training | 112,098 | 9,650 | (8.6) |
| Development | 23,602 | 3,759 | (15.9) |
| Test | 23,650 | 3,647 | (15.4) |

MCNN 60 was pre-trained with 300-dimensional word embedding vectors using skip-gram with a negative-sampling algorithm on the original Japanese data (2.4 M sentences, 0.6 M words) from which the causality candidates were extracted in Non-Patent Literature 1. The skip size was set to 5 and the number of negative samples was set to 10. In these sentences, words appearing less than 5 times were removed and treated as unknown words, and a random vector was assigned to them. Further, variables in the patterns are also treated as unknown words and random vectors were given.

In all experiments, a dropout of 0.5 was applied to the final layer of MCNN 60, and training was done by SGD (Stochastic Gradient Descent) with mini-batches of 100 samples and a learning rate decay=0.95. The training ran five epochs through all of the training data.

Hyper parameter settings were examined as follows, using Development data. For the combination of N-grams, we tried 3, 4 and 5 combinations from {2, 3, 4, 5, 6}. For example, a combination can be represented as (2, 3, 4)×200, which means a combination of 2-, 3- and 4-grams with 200 filters each. N-gram combinations were restricted to consecutive N. For instance, a combination of 2, 3, 4 was examined while 2, 4, 6 was not adopted. The number of filters was selected from 50, 100 and 200. The number of hyper-parameter settings was 18, and all of them were examined.

Following Non-Patent Literature 1, Average Precision (AP) was adopted as the evaluation metric. Using top two hyper-parameter settings according to AP obtained by Development data, 5 models were trained for each hyper-parameter setting, and applied AP over 2×5 models to calculate final precision. Table 2 presents the best hyper-parameter settings and its AP results of the Development data for hyper parameter tuning.

TABLE 2

| Method | AP |
|---|---|
| Base (2, 3, 4) × 200 | 46.85 |
| Base + BP (2, 3, 4, 5) × 100 | 51.29 |
| Base + WH (3, 4, 5) × 200 | 50.20 |
| Base + CL (3, 4, 5) × 100 | 48.28 |
| Base + BP + WH (2, 3, 4, 5, 6) × 200 | 52.23 |
| Base + BP + CL (4, 5, 6) × 50 | 50.83 |
| Base + WH + CL (4, 5, 6) × 100 | 50.15 |
| Base + BP + WH + CL (2, 3, 4, 5, 6) × 50 | 52.17 |

In this table, Base is a model that uses only the cause and effect parts of a causality candidate and the contexts in the original sentence, based on the same idea as the above-described embodiment. Acronyms used in Table 2 and their meanings are as follows: BP uses binary patterns, WH uses answers of why-type question-answering system, CL uses set of sentences having clue terms. The best performance was obtained by Base+BP+WH (2, 3, 4, 5, 6)×200.

TABLE 3

| Methods | AP |
|---|---|
| Methods of the Invention | |
| Base | 49.34 |
| Base + BP | 54.32 |
| Base + WH | 52.03 |
| Base + CL | 50.56 |
| Base + BP +WH | 54.85 |
| Base + BP + CL | 54.01 |
| Base + WH + CL | 52.05 |
| Base + BP + WH + CL | 54.76 |
| NPL 1 | 47.32 |
| NPL1 + BP | 47.39 |
| NPL1 + WH | 43.41 |
| NPL1 + CL | 42.92 |
| NPL1 + BP + WH | 47.52 |
| NPL1 + BP + CL | 46.96 |
| NPL1 + WH + CL | 42.97 |
| NPL1 + BP + WH + CL | 46.59 |
| CNN-SENT | 43.76 |

Table 3 shows the experimental results on the Test data. For comparison, in addition to the results of the present invention, those of other conventional methods are also shown. While Non-Patent Literature 1 uses SVM, SVM was fine-tuned with Development data using all the features, and tested by combining BP, WH and CL used in the embodiment above. In the experiments on Non-Patent Literature 1, all binary patterns were used, not just the fifteen patterns as in the embodiment above.

In Table 3, "CNN-SENT" denotes an example having the same configuration as the embodiment above except that a single-column convolutional neural network (CNN) is used in place of MCNN 60. The difference here is that it scans the original sentence including the causality candidate. Hyper parameters were optimized and model AP was calculated by the same method as described above.

As can be seen in Table 3, the method of the present invention achieved better AP than other methods. The best AP (54.85%) of the method in accordance with the present invention was achieved by a combination of Base+BP+WH, which was 7% higher than the best value (47.52%) of Non-Patent Literature 1. By the use of MCNN 60, 5.6% improvement of AP could be obtained as compared with the example using single column CNN (CNN-SENT vs. Base). Integrating background knowledge obtained from the binary patterns and the answers of why-type question-answering system attained 5% improvement of AP (Base vs. Base+BP+WH).

Figure 9:
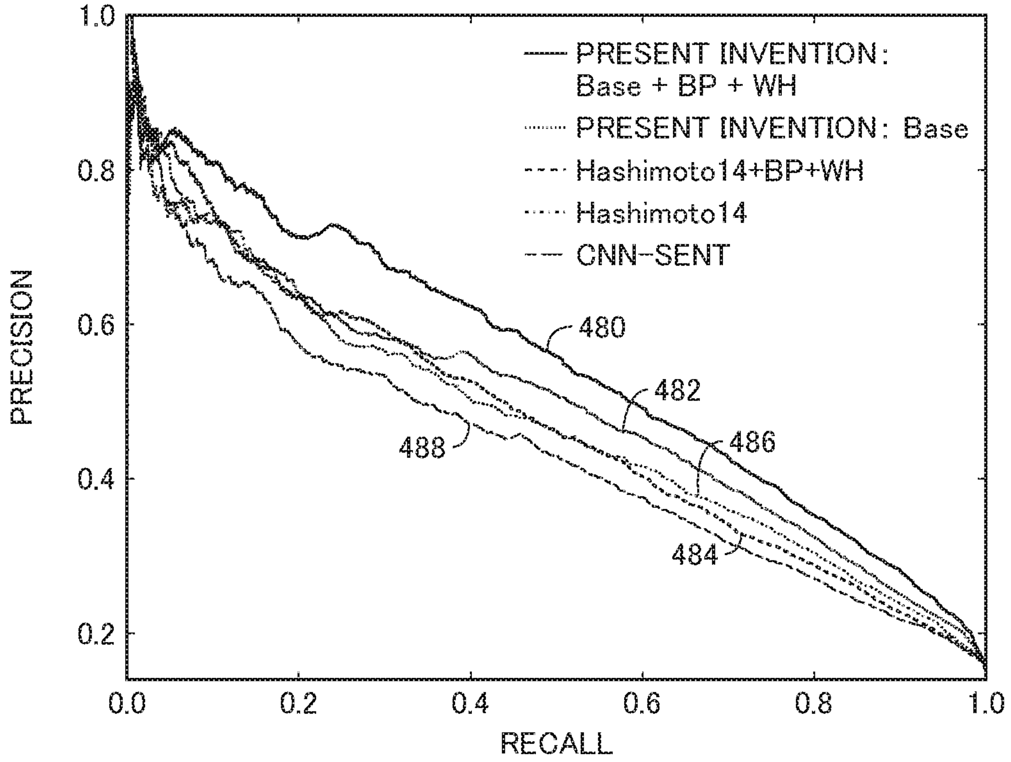
FIG. 9 is a graph representing results of experiments.

FIG. 9 shows PR (Precision-Recall) curves of some of the experimental settings. In the graph of FIG. 9, the abscissa represents recall, and the ordinate represents precision. Recall indicates the ratio of the number of proper causalities existing in a prescribed number of high score samples to the number of all proper causalities existing in the target data, and precision indicates the ratio of proper candidates to the prescribed number of high score samples. A PR curve plots a relation between the recall and the precision when the number selected from the top scores is changed successively. A higher PR curve in the graph represents a better result.

Referring to FIG. 9, a graph 480 representing the best result (Base+BP+WH) of the present invention is positioned significantly higher than all other PR curves. Further, a graph 482 representing the result of the present invention not using the background knowledge (Base) is also positioned higher than a graph 484 of conventional example of Non-Patent Literature 1+BP+WH, a graph 486 of Non-Patent Literature 1 and a graph 488 representing CNN-SENT, confirming effectiveness of the present invention.

It can also be seen from Table 3 that all the methods in accordance with the present invention attained higher AP than the conventional arts. Specifically, all the background knowledge sources described in the embodiment above are effective in improving AP in the present invention. Further, it can be seen that the combination of these sources of background knowledge attained further improvement of AP than when only one source is used, except for CL (related passage based on clue terms). The reason for this may be that the background knowledge is obtained by a simple process and thus the knowledge may be noisy. Use of CL alone, however, still attained improved AP than the conventional art. Therefore, arbitrary combination of background knowledge sources described above can be applied to the present invention.

Though MCNN 60 is used in the embodiment above, it is not the case that the present invention is made possible only by MCNN. A multicolumn LSTM (Long Short Term Memory) may be used in place of MCNN.

[Computer Implementation]

Figure 10:
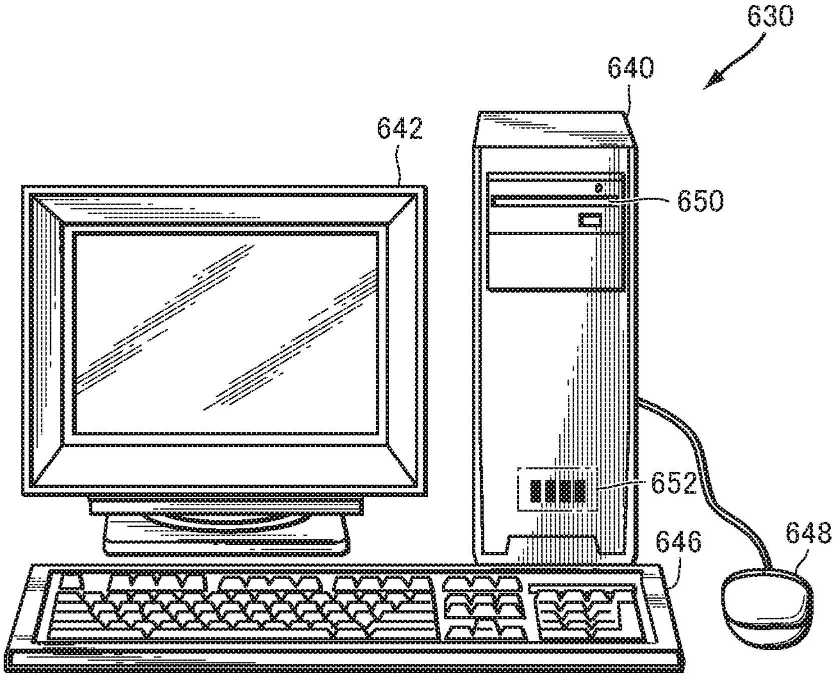
FIG. 10 shows an appearance of a computer system realizing the causality recognizing apparatus in accordance with an embodiment of the present invention.

The dialogue system, causality recognizing apparatus 30 and its various functional units in accordance with the embodiments above can be implemented by computer hardware and computer programs executed on the computer hardware. FIG. 10 shows an appearance of computer system 630 and FIG. 11 shows an internal configuration of computer system 630.

Referring to FIG. 10, computer system 630 includes a computer 640 having a memory port 652 and a DVD (Digital Versatile Disk) drive 650, a keyboard 646, a mouse 648, and a monitor 642.

Figure 11:
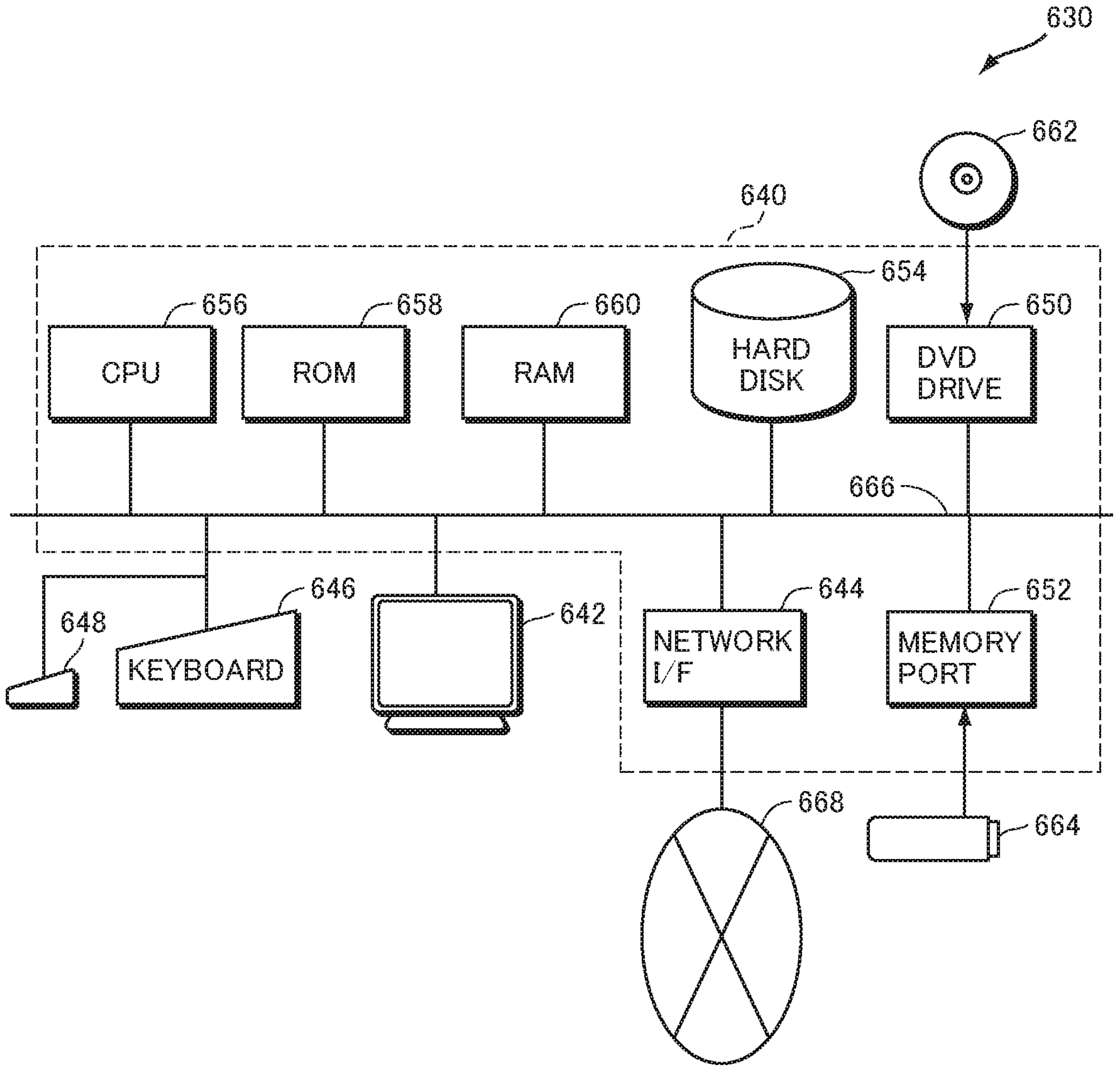
FIG. 11 is a block diagram showing hardware configuration of the computer system of which appearance is shown in FIG. 10.

Referring to FIG. 11, computer 640 includes, in addition to memory port 652 and DVD drive 650, a CPU (Central Processing Unit) 656, a bus 666 connected to CPU 656, memory port 652 and DVD drive 650, a read only memory (ROM) 658 storing a boot-up program and the like, a random access memory (RAM) 660 connected to bus 666, storing program instructions, a system program and work data, and a hard disk 654. Computer system 630 further includes a network interface 644 providing the connection to a network 668 allowing communication with another terminal.

The computer program causing computer system 630 to function as each of the functioning sections of the dialogue system in accordance with the embodiments above is stored in a DVD 662 or a removable memory 664 loaded to DVD drive 650 or to memory port 652, and transferred to hard disk 654. Alternatively, the program may be transmitted to computer 640 through a network 668 and stored in hard disk 654. At the time of execution, the program is loaded to RAM 660. The program may be directly loaded from DVD 662, removable memory 664 or through network 668 to RAM 660.

The program includes an instruction sequence of a plurality of instructions to cause computer 640 to operate as causality recognizing apparatus 30 and its functioning units in accordance with the embodiments above. Some of the basic functions necessary to realize the operation of computer 640 are provided by the operating system running on computer 640, by a third party program, by a program library or by various programming tool kits that can dynamically be linked, installed in computer 640. Therefore, the program may not necessarily include all of the functions necessary to realize the system, apparatus, and method of the present embodiment. The program has only to include instructions to realize the functions of the above-described system, apparatus or method by dynamically calling appropriate functions or appropriate program tools in a program tool kit in a manner controlled to attain desired results. Naturally, all the necessary functions may be provided by the program alone.

INDUSTRIAL APPLICABILITY

The present invention is capable of finding causalities that are not directly foreseeable to humans from a large number of information represented by texts on the net, enabling generation of effective guidelines and predictions related to business plans, production plans, research programs of various scientific, humanities and other fields. Therefore, the present invention can effectively be applied to all fields of industry, not only to the fields providing the afore-mentioned services.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

30 causality recognizing apparatus
32 causality candidate
36 question-answering system
38 web archive
50 candidate vector generating unit
52 context vector generating unit
54 binary pattern vector generating unit
56 answer vector generating unit
58 related passage vector generating unit
60 Multicolumn Convolutional Neural Network (MCNN)
62 threshold value storage unit
64 determining unit
80, 150, 200 candidate storage unit
82 word separating unit
84, 114, 158, 210 morphological analysis unit
86, 116, 160, 212 dependency analysis unit
88 to 94 first to fourth context vector generating unit
110 causality candidate storage unit
112 candidate sentence retrieving unit
118 binary pattern retrieving unit
120 binary pattern count storage unit
122 binary pattern sorting unit
124 binary pattern selecting unit
126 binary pattern concatenating unit
128 binary pattern dictionary
152 question sentence forming unit
154 answer obtaining unit
156 answer/score storage unit
162, 204 clue term dictionary
164, 214 pattern generating unit
166 pattern/original score storage unit
168, 218 pattern sorting unit
170, 220 pattern selecting unit
172, 222 pattern concatenating unit
202 word extracting unit
206 related passage obtaining unit
208 related passage storage unit
216 pattern/frequency storage unit
344 Softmax layer
360 to 374 convolutional neural networks of the first to eighth columns

The invention claimed is:

1. A causality recognizing apparatus for automatically recognizing a causality represented by first and second phrases found in text, wherein said first phrase is a candidate of a cause part of said causality, and said second phrase is a candidate of an effect part of said causality, and said first and second phrases both include a combination of a noun-phrase and a predicate;

said causality recognizing apparatus comprising:

a processor and memory, the processor configured to:

receive a causality candidate including said first and second phrases, for generating a set of first word vectors each representing a word sequence forming the causality candidate;

generate second word vectors respectively representing word sequences forming contexts in which said first and second phrases appear in said text;

generate a background knowledge word vector representing background knowledge for determining presence/absence of causality between the noun-phrase included in said first phrase and the noun-phrase included in said second phrase; and the causality recognizing apparatus including an artificial neural network pre-trained to output, by receiving said first and second word vectors and the background knowledge word vector, an index indicating that said causality candidate from which said set of first word vectors are derived represents causality; wherein the processor is configured to perform at least one of collecting a pattern including the noun-phrase included in said first phrase, the noun-phrase included in said second phrase and a predicate connecting these noun-phrases from a large number of documents, and generating a third word vector representing a word sequence of the pattern, generating a why-type question from said causality candidate, receiving a set of answers to the why-type question from a why-type question answering apparatus, and generating a fourth word vector representing a word sequence including at least the noun-phrase included in said first phrase and the noun-phrase included in said second phrase, from an answer including both the noun-phrase included in said first phrase and the noun-phrase included in said second phrase, among the answers in said set of answers, and generating, from a passage as a set of prescribed number of consecutive sentences existing in a large number of documents, in which the noun-phrase included in said first phrase, the noun-phrase included in said second phrase and a clue term related to causality co-occur, a fifth word vector representing a word sequence concatenating the noun-phrases included in said first and second phrases, a word representing dependency between these in said set of sentences and said clue term included in said set of sentences.

2. The causality recognizing apparatus according to claim 1, wherein said artificial neural network includes a multi-column neural network having a plurality of columns and learned in advance to receive said first and second word vectors and the background knowledge word vector at sub-networks of different columns respectively and to output an index indicating that said causality candidate from which said set of first word vectors are derived represents causality.

3. The causality recognizing apparatus according to claim 2, the processor configured to collect, from said large number of documents, a binary pattern formed of a pattern including the noun-phrase included in said first phrase, the noun-phrase included in said second phrase, and the predicate connecting the noun-phrases, count frequency of appearance of the binary pattern, and generate a word sequence word vector representing a word sequence forming a prescribed number of binary patterns having top frequency counts from the binary patterns collected and output the word sequence word vector as said third word vector.

4. The causality recognizing apparatus according to claim 1, the processor configured to generate a why-type question by adding an interrogative representing a why-type question to said second phrase and applying it to said why-type question answering apparatus, thereby obtaining a set of answers from said why-type question-answering apparatus, extract a prescribed number of answers including both the noun-phrase included in said first phrase and the noun-phrase included in said second phrase, from said set of answers, analyze dependency of each of the answers extracted and generate a dependency structure, and generate, for each of the answers extracted, a word sequence word vector representing a word sequence including the noun-phrases included in said first and second phrases and a word at a position of a prescribed relation on said dependency structure, and output it as said fourth vector.

5. The causality recognizing apparatus according to claim 1, the processor configured to retrieve, from a large number of documents, a passage as a set of prescribed number of consecutive sentences, in which the noun-phrase included in said first phrase, the noun-phrase included in said second phrase and a clue term related to causality co-occur, analyze dependency of the passage retrieved and generate a dependency structure, and generate a fifth word vector from a word sequence by concatenating a word existing on a path between the noun-phrases included in said first and second phrases in the dependency structure and said clue term included in the passage.

* * * * *